United States Patent
Ying et al.

(10) Patent No.: US 10,328,917 B2
(45) Date of Patent: Jun. 25, 2019

(54) METHOD AND SYSTEM FOR MITIGATING SWAY OF A VEHICLE TRAILER BY BRAKING THE TOWING VEHICLE DURING THE CORRECT PHASE OF THE SWAY

(71) Applicant: Autoliv ASP, Inc., Ogden, UT (US)

(72) Inventors: Long Ying, Novi, MI (US); Shuyang Wang, Royal Oak, MI (US)

(73) Assignee: VEONEER NISSIN BRAKE SYSTEMS JAPAN CO. LTD., Ueda-Shi, Nagano-Ken (JP)

(*) Notice: Subject to any disclaimer, the term of this patent is extended or adjusted under 35 U.S.C. 154(b) by 151 days.

(21) Appl. No.: 15/639,476

(22) Filed: Jun. 30, 2017

(65) Prior Publication Data

US 2019/0001944 A1    Jan. 3, 2019

(51) Int. Cl.
*B60T 7/20* (2006.01)
*B60T 8/24* (2006.01)
*B60T 8/1755* (2006.01)

(52) U.S. Cl.
CPC ............ *B60T 8/248* (2013.01); *B60T 7/20* (2013.01); *B60T 8/17551* (2013.01); *B60T 2230/06* (2013.01)

(58) Field of Classification Search
CPC ......... B60T 8/248; B60T 7/20; B60T 8/17551
See application file for complete search history.

(56) References Cited

U.S. PATENT DOCUMENTS

| | | | |
|---|---|---|---|
| 6,523,911 B1 | 2/2003 | Rupp et al. | |
| 7,917,274 B2 | 3/2011 | Hackney et al. | |
| 8,180,543 B2* | 5/2012 | Futamura | B60T 8/1708 180/14.1 |
| 8,862,327 B2 | 10/2014 | Waldbauer et al. | |
| 9,026,311 B1* | 5/2015 | Pieronek | B60W 10/18 280/455.1 |
| 9,238,483 B2 | 1/2016 | Hafner et al. | |
| 2006/0155457 A1 | 7/2006 | Waldbauer et al. | |
| 2008/0172163 A1* | 7/2008 | Englert | B60T 7/20 701/83 |

(Continued)

FOREIGN PATENT DOCUMENTS

| | | |
|---|---|---|
| JP | 2006505442 A | 2/2006 |
| WO | WO-2011042966 A1 | 4/2011 |
| WO | WO-201170645 A1 | 6/2011 |

*Primary Examiner* — Jess Whittington
(74) *Attorney, Agent, or Firm* — Stephen T. Olson; Harness, Dickey & Pierce, P.L.C.

(57) ABSTRACT

A method for mitigating sway of a trailer being towed by a leading vehicle is disclosed. The method may involve using a controller of the vehicle to determine when a trailer sway condition has arisen that requires a mitigating action. The controller may be used to actuate a plurality of brakes of the vehicle, or to increase braking pressure being applied by a driver of the vehicle, when the trailer is detected as swaying toward a centerline of the vehicle from one side or another of the vehicle centerline. The controller may further be used to release the plurality of brakes, or to decrease a braking pressure being commanded by the driver, before the trailer has swayed past the vehicle centerline, and to repeatedly apply and release the vehicle brakes only while the trailer is detected as swaying toward the vehicle centerline, until the trailer sway condition has been mitigated.

20 Claims, 8 Drawing Sheets

(56) References Cited

U.S. PATENT DOCUMENTS

| | | | |
|---|---|---|---|
| 2011/0022282 A1* | 1/2011 | Wu | B60D 1/245 |
| | | | 701/70 |
| 2011/0029210 A1* | 2/2011 | Wu | B60D 1/30 |
| | | | 701/70 |
| 2017/0151935 A1* | 6/2017 | Prohaszka | B60T 8/1708 |

* cited by examiner

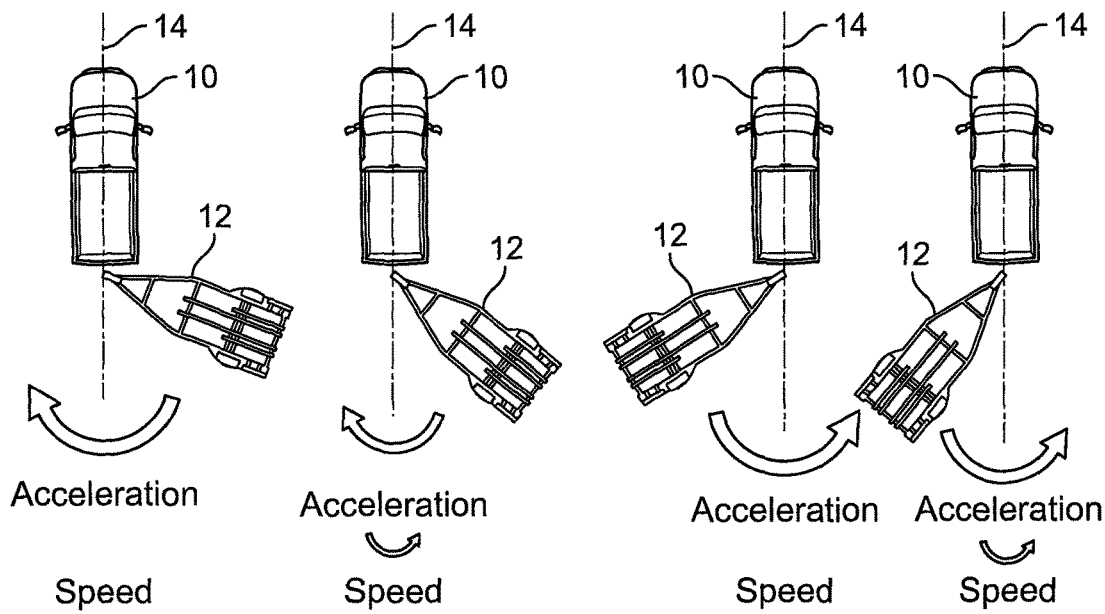

|  | Traditional TSA 502 | TSA - BMF 500 |
|---|---|---|
| Initial Speed | 41.5 kph | 41.5 kph |
| Final Speed | 41.5 kph | 28.0 kph |
| Deceleration Rate | 1.75 m/s² | 3.38 m/s² |
| Number of Sways | 4 | 3 |
| Maximum Brake Pressure | 5 MPa | 2 MPa |

METHOD AND SYSTEM FOR MITIGATING SWAY OF A VEHICLE TRAILER BY BRAKING THE TOWING VEHICLE DURING THE CORRECT PHASE OF THE SWAY

FIELD

The present disclosure relates to trailer sway control systems used with motor vehicles, and more particularly to a method and system for mitigating sway of a vehicle trailer being towed by a leading vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a motor vehicle is towing a trailer, a situation may arise in which the trailer oscillates or sways back and forth. This situation, commonly referred to as trailer sway, may become uncontrollable. Unless stabilized, trailer sway may be hazardous to vehicles in adjacent lanes, or in more severe circumstances may push the rear end of the leading vehicle (i.e., the vehicle performing the towing) laterally and cause the leading vehicle to fishtail and stray from the intended path.

Trailer sway frequently occurs when a leading vehicle and accompanying trailer are travelling too fast for a given set of road and/or environmental conditions. The difference of a few miles per hour in vehicle speed can have a significant impact on the sway of a trailer. When trailer sway occurs, it can be difficult for the driver of the leading vehicle to respond correctly to stabilize the situation. This may be due to inexperience and/or panic of the driver. The driver may forego applying the vehicle's brakes or, worse yet, may abruptly apply the brakes, such as what might be done during an emergency braking action. Such abrupt application of the brakes, at the wrong time, may cause the trailer to sway even more and/or possibly influence a direction of travel of the rear wheels of the leading vehicle, ultimately leading to jackknifing.

FIGS. 1 through 8 illustrate the angular velocity and angular acceleration of a trailer 12 swaying about its tongue, which is connected to a towing vehicle 10. The figures show the full range of the trailer's 12 swaying motion of travel. FIG. 1 assumes that the trailer 12 has swayed from a position far to the left of the vehicle's centerline 14 (i.e., from the driver side of the vehicle 10) and has reached the vehicle's centerline. Angular acceleration of the trailer is zero at this point, angular velocity is at a maximum value.

FIGS. 2-5 illustrate how the yaw acceleration of the vehicle 10 continuously increases until a maximum angular point of travel of the trailer 12 is reached (FIG. 6). Over the same arc of travel, the angular velocity of the trailer is continuously dropping, with the angular velocity being essentially zero at the point of angular travel shown in FIG. 6. From the point shown in FIG. 6, as the trailer 12 sways back toward the centerline 14, yaw acceleration of the vehicle 10 drops from a maximum value while the angular velocity increases, essentially as shown sequentially in FIGS. 6, 5, 4, 3, 2 and then 1, but with the Acceleration and Velocity arrows reversed in their directions. The same pattern repeats itself when the trailer 12 sways past the vehicle centerline 14 on the driver's side of the vehicle 10. FIG. 8 illustrates that the maximum yaw acceleration of the vehicle 10 is reached at a maximum point of angular travel of the trailer 12 on the driver's side, with the angular velocity of the trailer being essentially zero at this point. From the point shown in FIG. 8, the trailer 12 will begin swaying back to the vehicle centerline 14 as shown in FIG. 9. Thus, when swaying back to the vehicle's centerline 14, the yaw acceleration of the vehicle 10 will decrease while the angular velocity of the trailer 12 increases. The yaw acceleration of the vehicle 10 again reaches zero, and the angular velocity of the trailer 12 reaches a maximum, when the trailer 12 reaches the vehicle's centerline 14. This is shown in FIGS. 3, 2 and 1 but with the direction of change in magnitude being opposite to what is shown in these Figures.

Many current systems for stabilizing trailer sway operate to apply braking to one or two wheels on one side of the vehicle at a time, depending on the exact angular position of the trailer. Such systems attempt to eliminate trailer sway by inducing a moment on the leading vehicle to counteract the yaw moment caused by the tongue of the trailer acting on the receiver hitch of the vehicle. While such systems have proven to be useful for their intended purpose, a continuous need for improvement remains for the effectiveness. For example, a modern vehicle with an Electronic Stability Control (ESC) system already applies braking to one or two wheels on a side of the vehicle to stabilize it when excessive yaw is detected, even without specifically detecting trailer sway. This type of trailer sway control can only achieve minor modifications to the conventional ESC's yaw control and the modification is quickly limited by surface friction on slippery surfaces if the wheels are braked into slip. Some current systems have added overall vehicle braking on all four wheels to slow the vehicle and trailer down. Lower speed is known to promote trailer stability, but such systems typically activate with a very small amount of active braking. As explained above, abrupt braking can worsen trailer sway; and more four-wheel braking can limit the amount of side to side braking due to limited surface friction.

SUMMARY

According to one particular aspect, the present teachings provide a method for mitigating sway of a trailer being towed by a leading vehicle. The method may comprise using a controller of the vehicle to determine when a trailer sway condition has arisen that requires a mitigating action. The method may also include using the controller to apply a plurality of brakes of the vehicle or to increase a braking pressure being applied by a driver of the vehicle only when the trailer is detected as swaying toward a centerline of the vehicle from one side or another of the vehicle centerline. A controller may be used to release the plurality of brakes or to decrease the driver's braking effort before the trailer has swayed past the vehicle centerline and to hold the braking at low or zero pressure while the trailer is swaying away from the centerline. The controller may further be used to repeatedly apply or increase the vehicle brakes only while the trailer is detected as swaying toward the vehicle centerline, and release or decrease the brakes before the trailer reaches the vehicle centerline, and to hold the brakes at low or zero pressure while the trailer is swaying away from the vehicle.

According to another particular aspect, the present teachings relate to a method for detecting and mitigating sway of a trailer being towed by a leading vehicle. The method may comprise using a yaw rate sensor carried on the vehicle to provide a yaw rate signal representing a yaw rate of the vehicle. A yaw angle threshold detector module may be used which is operably associated with an electronic controller of the vehicle to detect when a magnitude of the yaw rate signal exceeds a preset threshold, and to provide a first output signal. A yaw angle zero crossing detector module may be used which is operably associated with the electronic controller to detect when the trailer sways across a vehicle centerline, and to provide a second output signal indicating that the trailer has crossed the vehicle centerline. The method may also involve causing the electronic controller to use the first and second output signals to apply a plurality of brakes of the vehicle as the trailer begins swaying toward the vehicle centerline from a location on one side or the other of the vehicle centerline. The method may further involve causing the electronic controller to use the second output signal to release the plurality of brakes before the second output signal indicates that the trailer has crossed the vehicle centerline, also causing the electronic controller to reapply and release the plurality of brakes during each one of a plurality of sway cycles of the trailer only while the trailer is detected as swaying toward the vehicle centerline.

In still another aspect the present disclosure relates to a system for detecting and mitigating sway of a trailer being towed by a leading vehicle by a selective application with optimal timing of a plurality of brakes of the vehicle. The system may comprise an electronic stability control (ESC) subsystem carried on the vehicle, as well as a yaw rate sensor carried on the vehicle to provide a yaw rate signal representing a yaw rate of the vehicle to the ESC subsystem. The system may further include a threshold detector module operably associated with the ESC subsystem to detect when a magnitude of the yaw rate signal exceeds a preset threshold, and to provide a first output signal indicating that the yaw rate signal has exceeded the present threshold. A yaw angle zero crossing detector module may be included which is operably associated with the ECU to detect when the trailer is about to sway across a vehicle centerline, and to provide a second output signal indicating that the trailer is about to cross the vehicle centerline. The ESC subsystem may be configured to use the first and second output signals and to apply the brakes of the vehicle as the trailer begins swaying toward the vehicle centerline from a location farthest on one side or the other from the vehicle centerline. The ESC subsystem may also be configured to use the second output signal to release the brakes before the second output signal indicates that the trailer has crossed the vehicle centerline. The ESC subsystem may further be configured to reapply the plurality of brakes during each one of a plurality of sway cycles of the trailer only while the trailer is detected as swaying toward the vehicle centerline, and to release the brakes before the trailer is detected as having reached the vehicle centerline.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 1-9 illustrate the angular velocity and acceleration of a trailer being towed by a leading vehicle at different points during the trailer's swaying motion of travel;

FIG. 16 illustrates the timing of the application of the brakes based on the correct phase, labeled 1, of the trailer sway swing, as opposed to the incorrect phase, labeled 2.

In the drawings, reference numbers may be reused to identify similar and/or identical elements.

DETAILED DESCRIPTION

Figure 10:
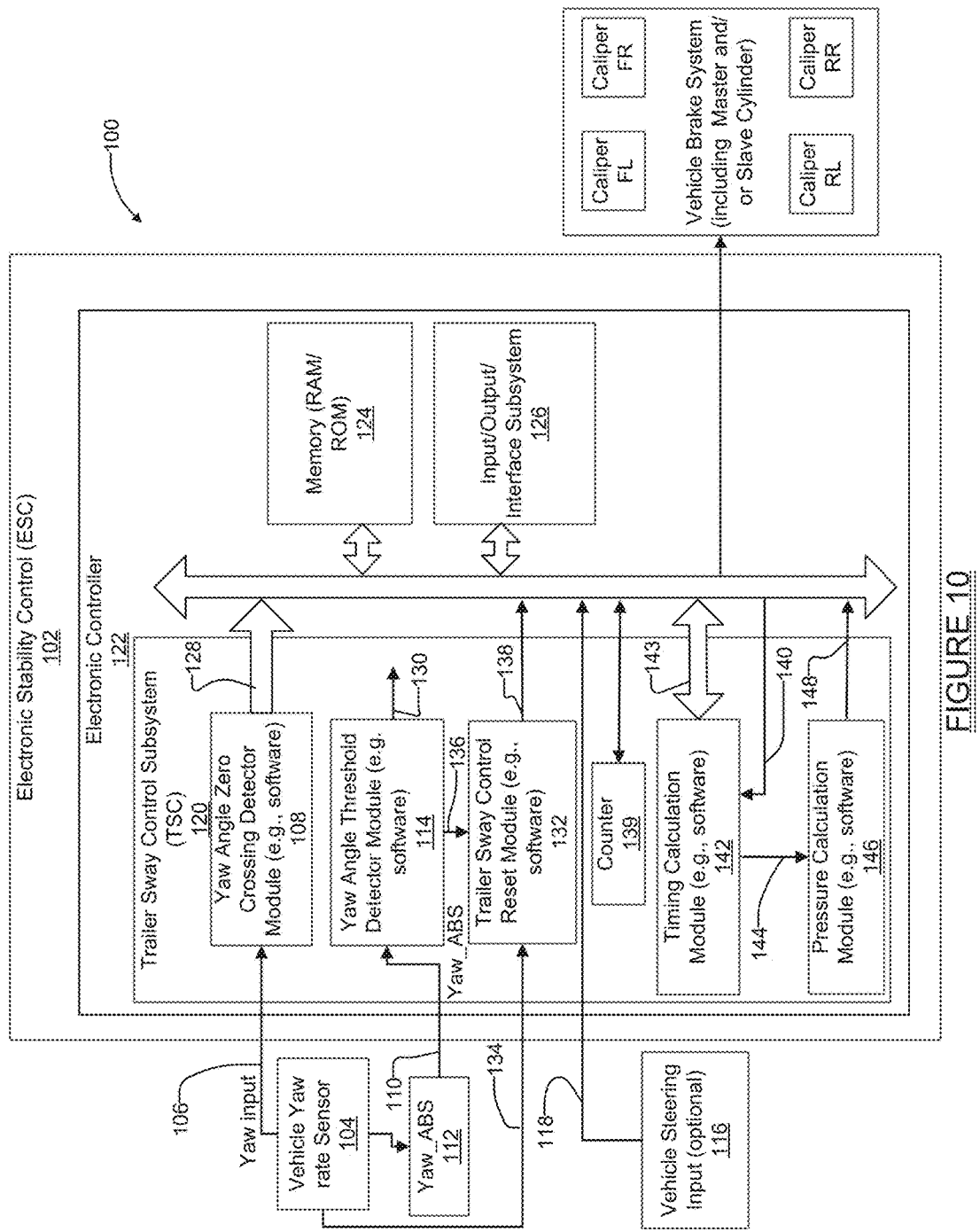
FIG. 10 is a block diagram of one embodiment of a system in accordance with the present disclosure for detecting and mitigating trailer sway.

FIG. 10 shows one embodiment of a trailer sway control system 100 (hereinafter simply "system 100") in accordance with the present disclosure. The system 100 in this example is shown integrated into an existing controller of an Electronic Stability Control (ESC) system 102 of a motor vehicle such as vehicle 10 shown in FIGS. 1-9. However, it will be appreciated that the system 100 could just as readily be implemented using a stand-alone processing system/module having its own electronic controller that is interfaced to the ESC system 102 using a suitable cable. Both implementations are contemplated by the present disclosure. The following discussion, however, focuses on the implementation where the system 100 is integrated into, and makes use of, the processing capability of the existing ESC system 102.

The system 100 may make use of an existing vehicle yaw rate sensor 104 to provide a real-time vehicle yaw rate input signal 106 to a yaw angle zero crossing detector module 108. An absolute value yaw angle input signal 110 is obtained from a yaw angle absolute value module 112 and provided to a yaw angle threshold detector module 114. A vehicle steering input 118 from an existing vehicle steering wheel position sensor 116 is optional, but if incorporated may enable the system 100 to detect if the vehicle 10 has entered a slalom maneuver that produces an alternating vehicle yaw pattern similar to that experienced during a trailer sway condition, but for which no trailer sway mitigation is needed. For the above-mentioned components, the term "existing" is intended to mean those components that are typically present on modern day cars and trucks.

The system 100 may also include a trailer sway control subsystem (hereinafter "TSC 120") integrated, for example, into the firmware of the ESC system 102 or other memory accessible by the ESC system 102. In one example, the TSC 120 may be integrated into firmware associated with an electronic controller 122 of the ESC subsystem 102. The electronic controller 122 may comprise a microprocessor or any other suitable type of processor, a memory 124 (e.g., RAM, ROM for ECU 102 firmware, etc.), and an input/output interface subsystem 126 for enabling the ECU 102 to communicate with the various other subsystems, sensors, etc. associated with the vehicle 10.

The yaw angle zero crossing detector module 108 operates to monitor the yaw rate input signal 106 in real time and generates an output signal at 128 when the yaw angle is calculated as either crossing the zero point (i.e., which will correspond to the vehicle centerline 14), or reaching within a few percent (e.g., 2%-10%) of the zero crossing point (which corresponds to a few degrees from the vehicle centerline 14).

The yaw angle threshold detector module 114 detects when the vehicle yaw angle exceeds a predetermined yaw angle threshold, which indicates that a trailer sway condition may be developing. The yaw angle threshold detector module 114 generates an output 130 that may be used by the electronic controller 122 in helping to determine a required braking action, to be explained in detail in the following paragraphs.

The TSC 120 may further include a trailer sway control reset module 132 which receives a vehicle yaw rate signal 134 as an input, as well as an output 136 from the yaw angle threshold detector module 114, and which uses these two signals to determine when a trailer sway condition has been reduced to the point that no further trailer sway mitigating action is needed. The trailer sway control reset module 132 generates a reset signal 138 which is used by the electronic controller 122 to reset an internal sway cycle counter 139 and to exit a previously entered trailer sway control operating sequence.

When the trailer sway control operating sequence is entered, the TSC 120, operating in connection with the electronic controller 122, generates a timing control signal 140 which is received by a timing calculation module 142. This timing calculation module 142 controls the timing of applying and releasing the brakes of vehicle 10. It issues a timing signal 144 that is applied to a pressure calculation module 146 of the system 100. The timing signal 144 informs the pressure calculation module 146 that the vehicle's brakes are to be applied. The timing calculation module 142 also generates a signal 143 which informs the ESC subsystem 102 when the vehicle's brakes are to be released.

The pressure calculation module 146 calculates a pressure to be applied by the vehicle's 10 braking system when actuating the brakes, and provides a signal 148 to the vehicle's braking system to actuate the vehicle's brakes using the calculated pressure. It will be appreciated, however, that a predetermined fixed braking pressure could be used instead of a real-time pressure calculated braking pressure. However, the real-time calculated braking pressure provides for a significantly greater degree of braking control to be implemented by the system 100, providing faster deceleration of the vehicle under severe trailer-sway conditions.

In one embodiment, the system 100 may be used to actuate all four of the vehicle brakes simultaneously and with the same degree of brake pressure. Alternatively, only two of the vehicle's brakes may be actuated. If just two of the brakes are actuated, it is preferred that they be on different sides of the vehicle, for example either the front/left and front/right brakes, or the rear/left and rear/right brakes. It is important to note that, if all four vehicle brakes are actuated at once, the braking force applied to the front brakes could be different than the braking force applied to the rear brakes. It is expected that in most implementations, it may be preferred to simply apply the same pressure (i.e., actuation force) to all four of the vehicle's brake calipers when the TSC 120 is actively controlling the vehicle's brakes to mitigate a trailer sway condition.

A significant feature of the TSC 120 is that it applies braking pressure to the vehicle's brake calipers only when trailer 12 begins swaying toward the vehicle's centerline 14, for example as shown in FIG. 7, and then releases the brakes when the trailer 12 reaches the centerline, or just slightly before (e.g., 2%-10%) the trailer reaches the centerline, such as the position shown in FIG. 2. This important control feature is discussed further in connection with FIG. 16. This action helps to rapidly decelerate the vehicle 10, which in turn rapidly mitigates the swaying action affecting the trailer 12. Operation of the TSC 120 is also based on the understanding that it is crucial to avoid braking the vehicle 10 while the trailer 12 is swaying away from the vehicle's centerline 14. Applying a braking force to the vehicle's 10 brakes while the trailer 12 is swaying away from the vehicle's centerline 14 will exacerbate the trailer swaying motion.

The system 100 uses the vehicle's real-time yaw rate sensor signal 110, as well as the direction of the yaw rate sensor signal, to detect, in real time, when the trailer 12 has started to sway away from one extreme position of sway toward the vehicle's centerline 14. The yaw angle zero crossing detector module 108 determines when the zero crossing for the calculated yaw angle is reached, or is just about to be reached (i.e., when the calculated yaw angle signal is within 2%-10% of the zero crossing point).

Figure 11A:
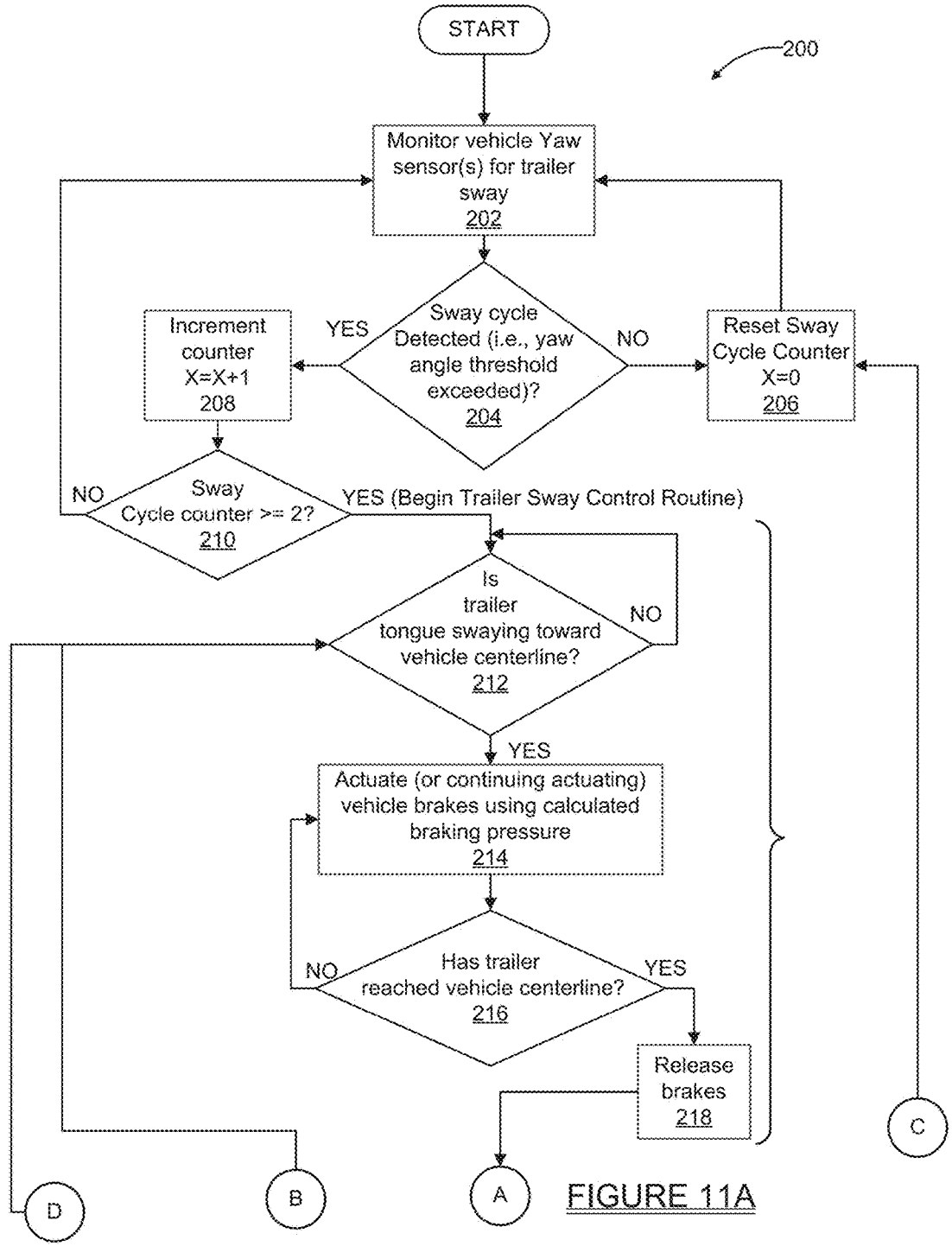
FIGS. 11A and 11B show a flowchart of one example of a series of operations that may be performed by the system of FIG. 10 in implementing a trailer sway control routine that mitigates, and in most cases completely eliminates, a trailer sway condition.
Figure 11B:
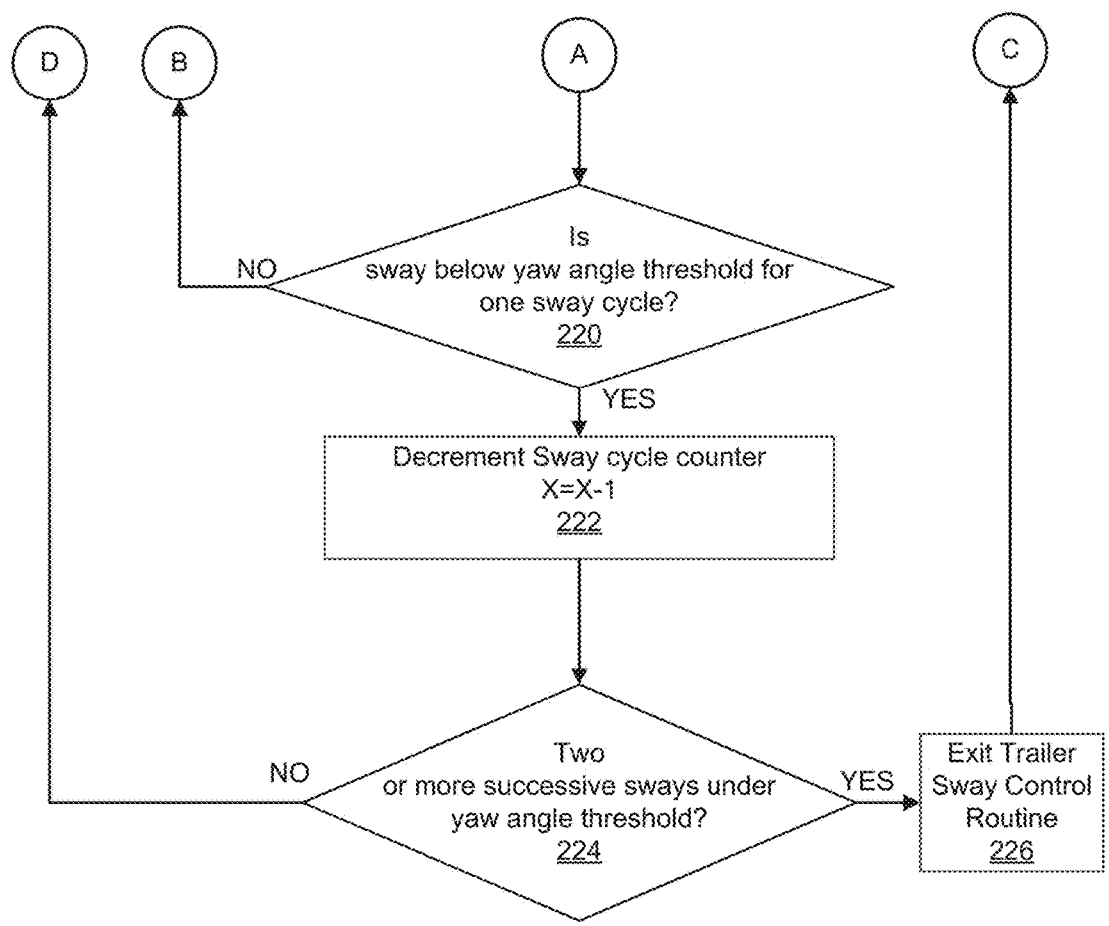

A flowchart 200, seen in FIGS. 11A and 11B, shows various operations that may be performed by the system 100 in executing the trailer sway control routine implemented by the TSC 120. The TSC 120, in connection with the electronic controller 122, continuously monitors the real time yaw rate of the vehicle 10 through the use of real-time yaw rate input signals 106 and 110, as indicated at operation 202. At operation 204 a determination is made if a preset yaw angle threshold has been exceeded. This preset yaw angle threshold may be a minimum value of yaw that would only be encountered at the beginning of a trailer sway condition or possibly when the operator of the vehicle 10 has made an abrupt lane change. If the threshold at operation 204 is not exceeded, then the sway cycle counter 139 (FIG. 10), for example implemented in software running on the ESC subsystem 102 (or alternatively as a separate digital hardware component within the ESC subsystem 102), may be reset, as indicated at operation 206. Operation 202 is then repeated.

If the check at operation 204 indicates that a sway cycle has been detected, then the sway cycle counter 139 is incremented at operation 208, and a check is made to determine whether or not two successive sways have been recorded. This means that two sway cycles in succession have been detected in which the trailer 12 has crossed the vehicle's centerline 14 and the degree of sway on each cycle has exceeded the preset minimum yaw angle threshold. If the check at operation 210 produces a "No" answer, then operations 202 and 204 are repeated. If the check at operation 210 produces a "Yes" answer, then the trailer sway control operations are initiated by the TSC 120.

When the TSC 120 begins actively mitigating a trailer sway condition it uses the information from the yaw rate sensor 104 and the yaw rate input signals 106 and 110 to determine if the trailer 12 is swaying toward the vehicle's centerline 14, as indicated at operation 212. If operation 212 produces a "No" answer, then the operation is repeated. At operation 212, the timing calculation module 142 of the TSC 120, using the yaw rate input signals 106 and 110, determines the point at which the trailer 12 has reached one extreme position of sway away from the vehicle's centerline 14, and has just started swaying back toward the vehicle's centerline. As the vehicle trailer 12 starts to sway back toward the vehicle's centerline 14, the absolute value of the yaw angle of the vehicle 10 will be decreasing (i.e., either getting less positive or less negative) but the angular velocity of the trailer 12 will be increasing. When this point is detected by the timing calculation module 142, which corresponds to a "Yes" answer at operation 212, the timing calculation module provides the timing signal 144 to the pressure calculation module 146. The pressure calculation module 146, operating in connection with the electronic controller 122, determines the braking pressure to be used when actuating the vehicle's 10 brakes and generates the braking pressure signal 148, which is used by the ESC 102 to actuate the vehicle's 10 brakes, as indicated at operation 214. This causes either a pair of the vehicle's 10 brake calipers (i.e., FL/FR calipers or RL/RR calipers) to be at least partially actuated, or all four of the vehicle's 10 brake calipers to be actuated.

At operation 216 the timing calculation module 142 of the TSC 120 continuously determines, using the yaw angle zero crossing detector module 108 and vehicle yaw rate information supplied by yaw rate input signal 106, whether or not the trailer 12 has reached the vehicle's centerline 14. The brakes will be applied until the answer of operation 216 is "Yes".

If the check by the timing calculation module 142 at operation 216 indicates that the trailer 12 has reached the vehicle's centerline 14, or alternatively is within a predetermined percentage or within a predetermined number of degrees of the vehicle's centerline, then the timing calculation module 142 generates signal 143 (FIG. 10), which signals the ESC subsystem 102 to release the vehicle's 10 brakes, as indicated at operation 218. Preferably the vehicle's 10 brakes are fully released as rapidly as operation of the ESC subsystem 102 and the vehicle's braking system allows, rather than gradually. It is important that the vehicle's 10 brake calipers be fully released by the time that the trailer 12 reaches the vehicle's centerline 14. This action of applying and releasing the brakes during one sway cycle, and specifically during the time that the trailer 12 has started swaying back toward the vehicle's center 14 but has not yet swayed past the vehicle's centerline, enables a rapid deceleration of the vehicle 10. Rapidly decelerating the vehicle 10 helps to rapidly mitigate the swaying action of the trailer 12.

At operation 220 in FIG. 11B, the TSC 120 makes a check using the yaw angle threshold detector module 114 if the sway action of the trailer 12, as represented by the yaw rate input signal 110, is below the preset yaw angle threshold for one sway cycle. If this operation produces a "No" answer, then operation 212 is repeated. If the check at operation 220 produces a "Yes" answer, then sway cycle counter 139 is decremented by one, as indicated at operation 222. A check is then made by the ESC subsystem 102 if two or more successive sways through the yaw zero crossing point have occurred which were all under the preset yaw angle threshold, as indicated at operation 224. This check may be made by the ESC subsystem 102 checking the sway cycle counter 139. If the check at operation 224 produces a "No" answer, then operation 212 is repeated. This indicates that the swaying action affecting the trailer 12 has not been mitigated to the point where it no longer requires the intermittent braking action initiated by the TSC 120. If the check at operation 224 produces a "Yes" answer, this means that at least two successive sway cycles have been detected (i.e., two sway passes through the vehicle's centerline 14) where the detected yaw angle of the vehicle 10 was below the preset yaw angle threshold each cycle, as sensed by the yaw angle threshold detector module 114. Under this circumstance the TSC 120 exits the trailer sway control portion of its control routine, as indicated at operation 226, by causing the trailer sway control reset module 132 to generate the reset signal 138 (FIG. 10). The reset signal 138 is used by the TSC 120 to reset the sway cycle counter 139, as indicated at operation 206. Operation 202 is then repeated by the TSC 120 to begin monitoring for the beginning of a new trailer sway condition requiring correction.

Figure 12:
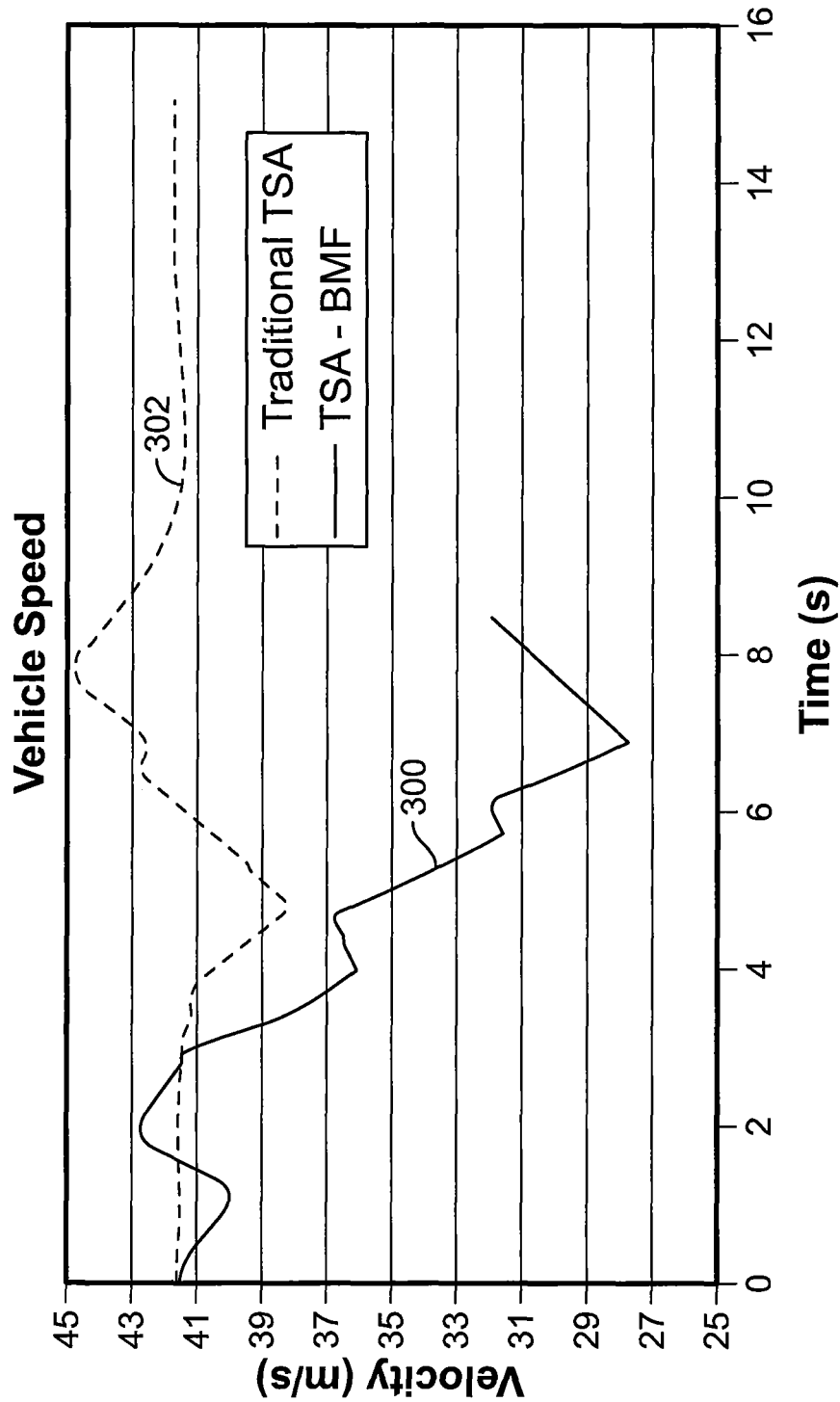
FIG. 12 shows a pair of graphs illustrating a comparison of how vehicle speed is significantly reduced using the method of the present disclosure, in comparison to an example of the vehicle speed that results when using a prior art trailer sway mitigation system.

As noted previously, the TSC 120 produces a rapid drop in vehicle speed when actuating the vehicle's brakes to mitigate a trailer sway condition. This speed reduction is shown in FIG. 12. Curve 300 represents one example of how the vehicle speed may be reduced by the system 100. Curve 302 represents a graph of vehicle speed that may occur with a conventional trailer sway reduction system which relies on actuating the vehicle's brakes individually at various times during a trailer sway event.

Figures 13, 14:
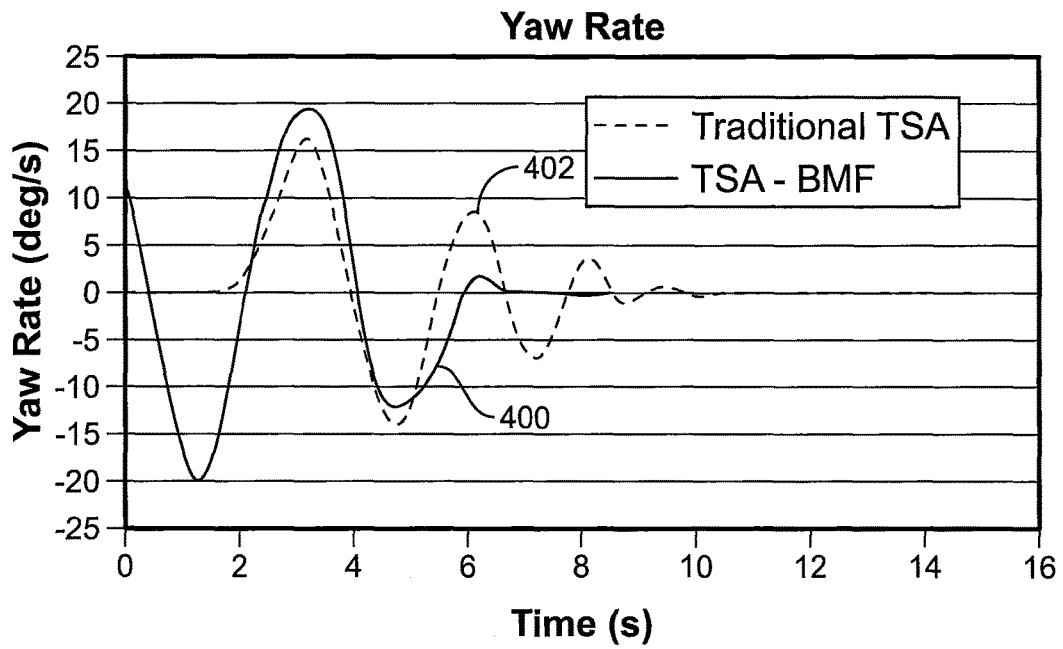
FIG. 13 shows a pair of graphs illustrating how rapidly a yaw rate of a leading vehicle is mitigated using the system and method of the present disclosure, in comparison to a yaw rate reduction occurring during use of a prior art trailer sway mitigation system.
FIG. 14 is chart illustrating a comparison of various performance factors (e.g., speed reduction, deceleration rate, etc.) of a prior art trailer sway reduction system and those of the system and method of the present disclosure.

FIG. 13 illustrates the dramatic reduction in the vehicle's 10 yaw severity when the system 100 implements the trailer sway control routine of the present disclosure. Curve 400 represents the yaw angle of the vehicle 10 using the TSC 120 to mitigate a trailer sway condition while curve 402 represents a yaw angle of a conventional trailer sway reduction system. The TSC 120 mitigates a trailer sway condition to an acceptable level several seconds or more before a conventional trailer sway reduction system is able to achieve the same degree of sway reduction.

FIG. 14 is a chart showing different vehicle related performance variables for a vehicle equipped with the TSC 120, as shown in column 500, and a vehicle equipped with a conventional trailer sway reduction system, as indicated in column 502. The TSC 120 produces a significantly lowered final vehicle speed and a significantly increased deceleration rate, as compared to a conventional trailer sway reduction system. The TSC 120 also accomplishes this while requiring significantly less braking pressure to be applied, as compared to a conventional trailer sway reduction system.

Figure 15:
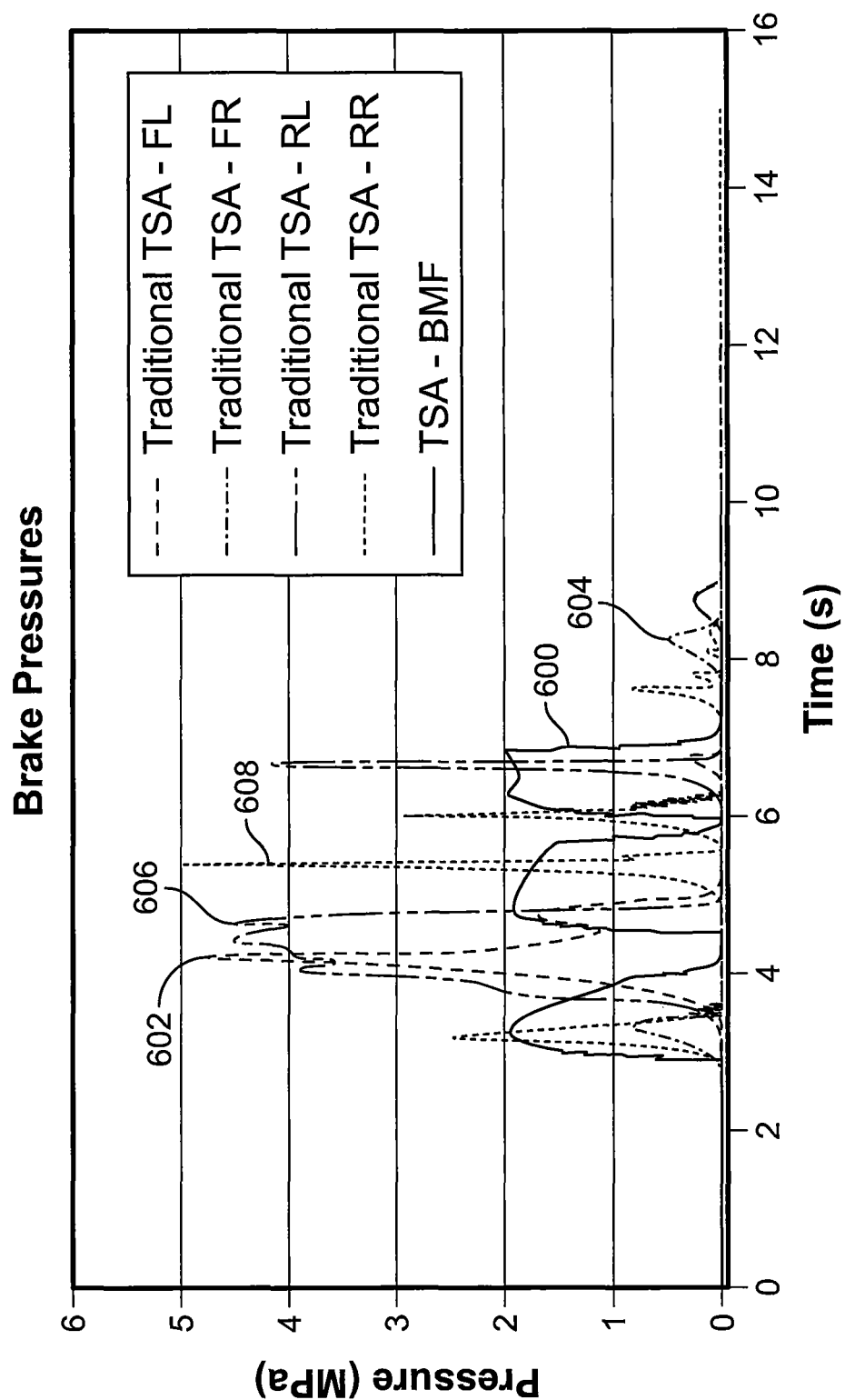
FIG. 15 shows a plurality of graphs illustrating brake pressures of a prior art trailer-sway-mitigation system, which relies on applying various brakes of the vehicle in a non-uniform manner, and the system and method of the present disclosure which simultaneously applies all of the brakes of the leading vehicle, in an intermittent fashion, when performing a trailer sway mitigation operation.

FIG. 15 further illustrates the braking pressure applied by the system 100, as represented by curve 600, in comparison to the braking pressure applied individually to the brakes of a vehicle using a conventional trailer sway reduction system, as indicated by curves 602, 604, 606 and 608. By applying the same braking pressure simultaneously to all of the vehicle's 10 brakes, the TSC 120 also significantly simplifies the actions required of the ESC subsystem 102 during the braking process and the processing, and is able to integrate with ABS systems without additional algorithm development. Conventional trailer sway reduction systems often require independent braking forces to be applied to each one of the vehicle's brakes. Since conventional systems have to do this in real time, often significant processing bandwidth is required from the vehicle's ESC subsystem.

Figure 16:
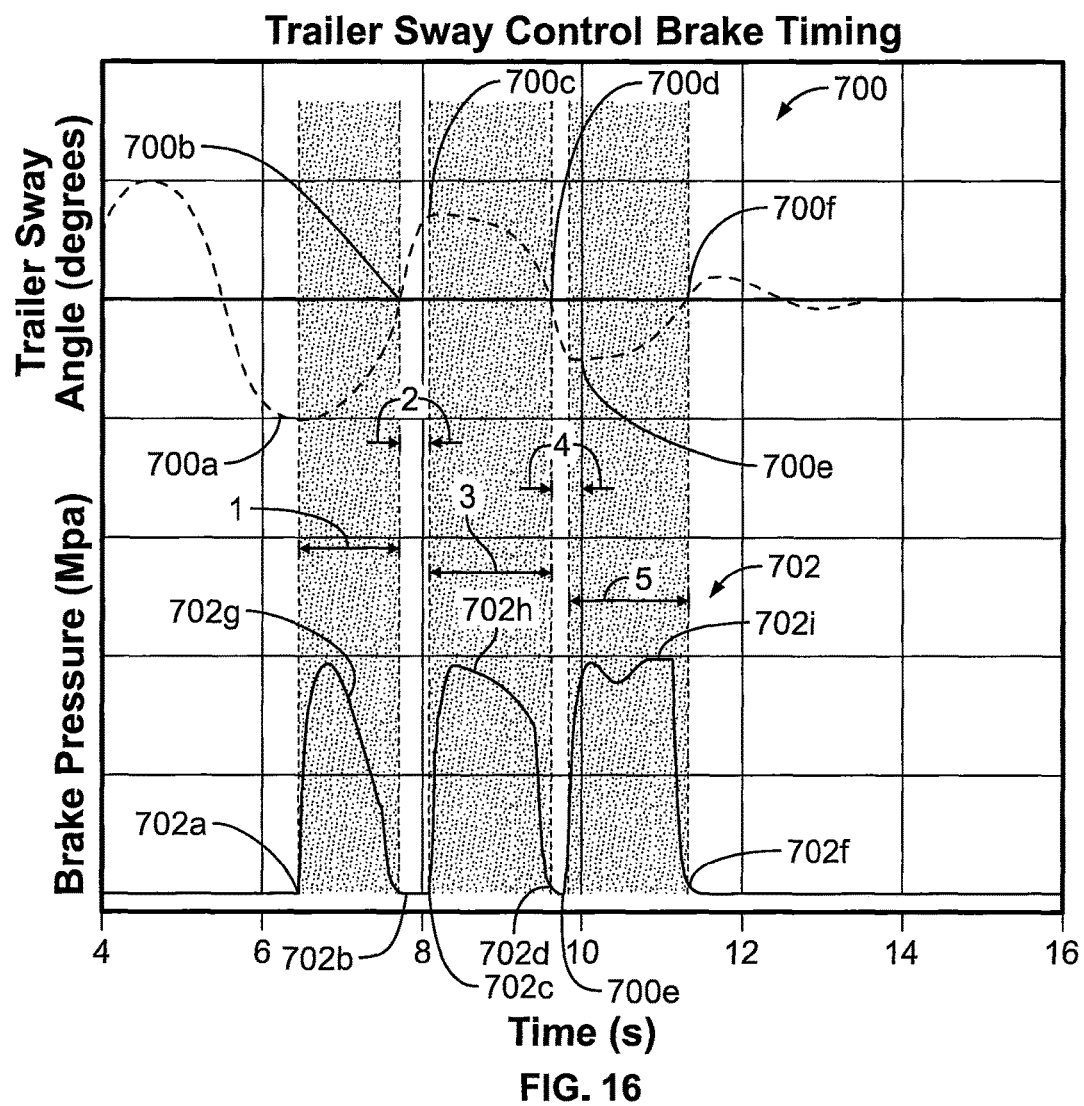
FIG. 16 shows a graph of trailer sway angle compared to brake pressure.

FIG. 16 shows a graph 700 of the trailer sway angle relative to a graph 702 showing the magnitude of brake pressure applied at various points during a plurality of sway cycles. For example, at point 700a on graph 700, the trailer 14 has reached a maximum angle of sway, and thereafter will begin swaying back toward the vehicle centerline 14. This position could correspond, for example, to the position of the trailer 12 in FIG. 6. At point 702a on graph 702, which corresponds to the trailer 12 having just begun to swing back toward the vehicle centerline 14, the electronic controller 122 generates a braking signal to the vehicle's brakes to cause a calculated braking force to be rapidly applied by the vehicle's brakes. The calculated braking force is applied for a time duration "1" which corresponds to that time duration between when the trailer 12 begins swinging back toward the vehicle centerline 14 to just prior to reaching the vehicle centerline. During time duration 1, the electronic controller 122 controls the vehicle brakes to begin releasing brake pressure as the trailer 12 swings closer to the vehicle centerline 14. At point 700b on graph 700 the trailer 12 has reached the centerline 14. At this point, which corresponds to point 702b on graph 702, the electronic controller 122 has controlled the brakes to fully remove brake pressure. During time interval 2, no brake pressure is applied to the vehicle's brakes as the trailer 12 continues swaying away from the vehicle centerline 14. At point 700c on graph 700, the maximum sway of the trailer 14 in the opposite direction is detected by the TSC 120, and the electronic controller 122 uses this information to again generate a control signal that causes the vehicle brakes to rapidly begin applying the calculated braking force, as indicated at point 702c on graph 702. The calculated braking brake force is applied during time duration "3" until just prior to the trailer 12 having swayed back to the vehicle centerline 14, which is represented by point 700d on graph 700. At this point, as indicated by point 702d on graph 702, the calculated braking force has been fully removed and the vehicle's brakes are fully released. During interval "4", while the trailer 12 is again swaying away from the vehicle centerline 14, no braking pressure is being applied. At point 700e, the trailer 12 has reached its maximum degree of sway, and virtually immediately thereafter the electronic controller 122 again controls the vehicle's brakes to apply the calculated braking pressure, as indicated at point 700e. The calculated braking pressure is maintained during time interval 5 and then released, as indicated at point 702f, just prior to the trailer 12 reaching the vehicle centerline 14, as indicated at point 700f. The above described control methodology is repeated until two successive sway cycles are detected that are below the preset yaw angle threshold as described above in connection with the flowchart of FIGS. 11A and 11B.

From the foregoing it will be noted by sections 702g, 702h and 702i of graph 702, that the electronic controller 122 may control the calculated braking pressure being applied by the vehicle's brakes in a manner which releases the braking pressure earlier during more extreme degree yaw cycles of trailer sway (during high detected yaw rate sway cycles), and may maintain the calculated braking force applied during a longer portion of the braking intervals during small detected yaw rate sway cycles. For example, the duration during which the full calculated braking pressure is applied during time duration 1 may be significantly less than the time interval during which the full calculated braking pressure is applied during time duration 5, as the yaw rate is much greater at the beginning of time duration 1 than the yaw rate is at the beginning of time duration 5. This ensures that when the trailer 12 is swaying toward the vehicle centerline 14 from a more extreme angle of sway, and therefore moving at a higher velocity as it reaches the vehicle centerline 14 than it would be from a smaller angle of sway, that the vehicle's brakes will be fully released just prior to the trailer 12 reaching the vehicle centerline 14.

It will also be appreciated from the graphs of FIG. 16 that the braking force (i.e., amount or magnitude) in one preferred implementation is based on yaw rate (i.e., not specifically identified in the graph). Essentially, when yaw angle is at its maximum, yaw rate is 0. When yaw rate is zero, brake pressure is at its maximum, which in one example may be 2 Mpa. Once the yaw rate exceeds a threshold, the brake pressure starts to decrease. This is evidence by the different angles (i.e., slopes) of portions 702g, 702h and 702i in FIG. 16. In the earlier sways, the yaw rate gets bigger faster, so the brake pressures decrease faster. In the last sway, the yaw rate never actually crosses the threshold, so brake pressures don't decrease gradually, and brake pressure is released all at once when brake pressure is no longer requested. Thus, the system provides the advantage that it can apply a variety of brake pressure levels. In fact, one important advantage of the system is that the system can apply significantly higher (i.e., higher than 2 MPa) pressure/deceleration than competitive systems, and therefore stop the trailer sway much quicker than competitive systems. It will also be appreciated that the above described method is just one way of implementing how much brake pressure may be applied. The threshold and brake pressure maximum could be changed to meet the needs of a specific application.

It will also be appreciated that the ESC subsystem 102 may control the vehicle's brakes to augment (i.e., modify) a pressure that the user is attempting to apply through a brake pedal of the vehicle. For example, if the user attempts to apply an additional braking force beyond what the ESC subsystem 102 is attempting to apply during a sway mitigation action, the ESC subsystem 102 may ignore this additional request for braking pressure. Conversely, if the user is applying some degree of braking pressure during the correct portion of the sway cycle (i.e., while the trailer is swaying toward the centerline), the ESC subsystem 102 may reduce the braking pressure to ensure that the brake pressure is fully released just prior to the trailer 12 being detected as swaying across the vehicle centerline 14.

The system 100 of the present disclosure, and particularly the TSC 120, is thus able to mitigate a trailer sway condition even more efficiently and more rapidly than a conventional trailer sway reduction system, and with a less complex braking sequence than that employed by a conventional trailer sway reduction system. The TSC 120 can be integrated into an existing ECU of a vehicle with no hardware modification to the ECU, and will make use of existing sensors on the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for mitigating sway of a trailer being towed by a leading vehicle, the method comprising: using a controller of the vehicle to determine when a trailer sway condition has arisen that requires a mitigating action;

using the controller during the mitigating action to apply a plurality of brakes of the vehicle or to increase a braking pressure being applied by a driver of the vehicle only when the trailer is detected as swaying toward a centerline of the vehicle from one side or another of the vehicle centerline;

using the controller during the mitigating action to release the plurality of brakes or to decrease the driver's braking effort before the trailer has swayed past the vehicle centerline and to hold the braking at low or zero pressure while the trailer is swaying away from the centerline;

and using the controller during the mitigating action to repeatedly apply or increase the vehicle brakes only while the trailer is detected as swaying toward the vehicle centerline, and release or decrease the brakes before the trailer reaches the vehicle centerline, and hold the brakes at low or zero pressure while the trailer is swaying away from the vehicle centerline.

2. The method of claim 1, wherein using the controller to determine when a trailer sway condition has arisen comprises using a signal from a yaw angle sensor that senses a yaw angle of the vehicle.

3. The method of claim 1, wherein using the controller to engage a plurality of brakes of the vehicle when the trailer is detected as swaying toward a centerline of the vehicle comprises using a yaw rate signal to determine when the trailer is swaying toward the vehicle centerline.

4. The method of claim 1, wherein using the controller to release the vehicle brakes before the trailer has swayed past the vehicle centerline comprises using a yaw angle zero crossing detector module to detect when the trailer is about to cross the vehicle centerline.

5. The method of claim 1, wherein using the controller to actuate a plurality of brakes comprises using the controller to actuate four brakes of the vehicle simultaneously to cause a deceleration in a longitudinal direction of the vehicle.

6. The method of claim 5, wherein the controller controls the four brakes so that each one of the four brakes applies the same braking force.

7. The method of claim 1, wherein using the controller to actuate the plurality of brakes comprises using the controller to control an application of braking force applied by the plurality of brakes so that each one of the plurality of brakes applies the same braking force.

8. The method of claim 1, wherein using the controller to detect when a trailer sway cycle has arisen comprises using the controller to detect that two successive sway cycles have occurred where the trailer has swayed across the vehicle centerline twice in succession while a yaw angle of the vehicle has exceeded a preset maximum yaw angle threshold on both of the two successive sway cycles.

9. The method of claim 1, wherein the repeated cycle of applying and releasing the brakes only during sway cycles where the trailer is detected as swaying toward the vehicle centerline is terminated after the trailer sway condition is no longer met.

10. The method of claim 6, wherein the controller further controls the brakes so that brake pressure is released earlier during a sway cycle having a high yaw rate than for a sway cycle having a lower yaw rate.

11. The method of claim 1, wherein the controller controls a magnitude of the braking force being applied at least in part in connection with a sensed yaw rate of the vehicle.

12. A method for detecting and mitigating sway of a trailer being towed by a leading vehicle, the method comprising:

using a yaw rate sensor carried on the vehicle to provide a yaw rate signal representing a yaw rate of the vehicle;

using a yaw angle threshold detector module operably associated with an electronic controller of the vehicle to detect when a magnitude of the yaw rate signal exceeds a preset threshold, and to provide a first output signal;

using a yaw angle zero crossing detector module operably associated with the electronic controller to detect when the trailer sways across a vehicle centerline, and to provide a second output signal indicating that the trailer has crossed the vehicle centerline;

causing the electronic controller to use the first and second output signals to apply a plurality of brakes of the vehicle as the trailer begins swaying toward the vehicle centerline from a location on one side or the other of the vehicle centerline;

causing the electronic controller to use the second output signal to release the plurality of brakes before the second output signal indicates that the trailer has crossed the vehicle centerline; and causing the electronic controller to reapply and release the plurality of brakes during each one of a plurality of sway cycles of the trailer only while the trailer is detected as swaying toward the vehicle centerline.

13. The method of claim 12, wherein the plurality of brakes comprises four brakes, and wherein the electronic controller actuates the four brakes simultaneously.

14. The method of claim 12, wherein, the electronic controller controls the plurality of brakes so that the same braking pressure is applied by each one of the plurality of brakes.

15. The method of claim 14, wherein the plurality of brakes comprises four brakes which are applied simultaneously and released simultaneously by the electronic controller; and wherein the electronic controller further controls the brakes so that brake pressure is released earlier during a sway cycle having a high yaw rate than for a sway cycle having a lower yaw rate.

16. The method of claim 12, wherein the electronic controller uses a count of a successive number of sway cycles that the trailer has been detected as swaying across the vehicle centerline, and when the yaw rate signal has exceeded the preset threshold for each one of the successive number of sway cycles.

17. The method of claim 16, wherein the electronic controller identifies that a trailer sway condition exists when the successive number of sway cycles reaches two sway cycles.

18. The method of claim 17, wherein the electronic controller identifies that the trailer sway condition no longer requires actuating and releasing the plurality of brakes by identifying when two successive sway cycles of the trailer have occurred where the yaw rate signal did not exceed the preset threshold.

19. A system for detecting and mitigating sway of a trailer being towed by a leading vehicle by a selective application with optimal timing of a plurality of brakes of the vehicle, the system comprising: an electronic stability control (ESC) subsystem carried on the vehicle; a yaw rate sensor carried on the vehicle to provide a yaw rate signal representing a yaw rate of the vehicle to the ESC subsystem; a threshold detector module operably associated with the ESC subsystem to detect when a magnitude of the yaw rate signal exceeds a preset threshold, and to provide a first output signal indicating that the yaw rate signal has exceeded the present threshold; a yaw angle zero crossing detector module operably associated with an electronic controller of the vehicle to detect when the trailer is about to sway across a vehicle centerline, and to provide a second output signal indicating that the trailer is about to cross the vehicle centerline; the ESC subsystem configured to: use the first and second output signals and to apply the brakes of the vehicle as the trailer begins swaying toward the vehicle centerline from a location farthest on one side or the other from the vehicle centerline; to use the second output signal to release the brakes before the second output signal indicates that the trailer has crossed the vehicle centerline; and to reapply the plurality of brakes during each one of a plurality of sway cycles of the trailer only while the trailer is detected as swaying toward the vehicle centerline, and to release the brakes before the trailer is detected as having reached the vehicle centerline.

20. The system of claim 19, wherein the ESC subsystem controls the brakes to release the brakes at different points during a sway cycle depending on a magnitude of the yaw rate acting on the vehicle.

\* \* \* \* \*